US012714998B2

(12) United States Patent
Brodard et al.

(10) Patent No.: US 12,714,998 B2
(45) Date of Patent: Aug. 25, 2026

(54) POWDER GRINDER

(71) Applicant: Frewitt fabrique de machines SA, Granges-Paccot (CH)

(72) Inventors: Yves Brodard, Vuadens (CH); Christian Rhême, Posieux (CH)

(73) Assignee: Frewitt fabrique de machines SA, Granges-Paccot (CH)

( * ) Notice: Subject to any disclaimer, the term of this patent is extended or adjusted under 35 U.S.C. 154(b) by 296 days.

(21) Appl. No.: 18/507,794

(22) Filed: Nov. 13, 2023

(65) Prior Publication Data

US 2024/0157369 A1 May 16, 2024

(30) Foreign Application Priority Data

Nov. 15, 2022 (CH) ............................... 001358/2022

(51) Int. Cl.
*B02C 13/31* (2006.01)
*B02C 13/14* (2006.01)
*B02C 13/284* (2006.01)
*B02C 23/04* (2006.01)
*B02C 25/00* (2006.01)

(52) U.S. Cl.
CPC .............. *B02C 13/31* (2013.01); *B02C 13/14* (2013.01); *B02C 13/284* (2013.01)

(58) Field of Classification Search
CPC ....... B02C 13/31; B02C 13/14; B02C 13/284; B02C 23/04
See application file for complete search history.

(56) References Cited

FOREIGN PATENT DOCUMENTS

| | | | | |
|---|---|---|---|---|
| DE | 1246366 | | 8/1967 | |
| DE | 1246366 B | * | 8/1967 | |
| EP | 1981641 | | 11/2016 | |
| WO | 2008129183 | | 10/2008 | |
| WO | WO-2008129183 A2 | * | 10/2008 | ............. B02C 18/18 |
| WO | 2014066921 | | 5/2014 | |
| WO | WO-2014066921 A1 | * | 5/2014 | ............. B02C 18/18 |

OTHER PUBLICATIONS

English translate (WO2014066921A1), retrieved date Oct. 26, 2025.*
English translate (DE1246366B), retrieved date Oct. 26, 2025.*
English translate (WO2008129183A2), retrieved date Oct. 26, 2025.*
Extended European Search Report issued in counterpart European App. 23208729.6, dated Mar. 15, 2024 (7 pages).

* cited by examiner

*Primary Examiner* — Mohammed S. Alawadi
(74) *Attorney, Agent, or Firm* — Tucker Ellis LLP

(57) ABSTRACT

The invention relates to a mechanical powder grinder comprising a casing supporting a first rotating grinding member and a second grinding member fixed relative to the casing, each of said first and second members being made of an electrically conductive material. According to the invention, the grinder includes an electrical control circuit providing at least one primary electrical connection between the first and second grinding members, and comprising at least one device for measuring an electrical parameter of said circuit. The grinder further comprises a processing device configured to detect an additional connection between the two grinding members, in particular due to the presence of a foreign body between said members, on the basis of the measured value of said parameter.

14 Claims, 2 Drawing Sheets

POWDER GRINDER

TECHNICAL FIELD OF THE INVENTION

The present invention relates to the field of powder grinders.

STATE OF THE ART

The powders used in the pharmaceutical, chemical or food industries typically have an average grain diameter of between 10 and 500 microns, and are obtained by grinding raw powders whose grains have an average diameter of, for example, between 100 microns and several millimeters.

The size of the grains involved calls for the use of suitable grinding devices.

Among the suitable grinders—known as mechanical grinders—are pin grinders, which comprise two parallel disks, each fitted with grinding elements, typically in the form of rods or pins, directed towards the adjacent disk. These grinding elements are designed to impact the material grains when the two disks rotate relative to one another.

There are also sieve grinders that combine two different principles of grain size reduction: the impact of the rotor on the grains and the forced passage of the grains through the sieve openings.

There are several types of sieve grinders, differentiated mainly by their shape and rotation speed. The main ones are:

- the conical sieve grinder, with a vertical-axis rotor fitted with blades that work in conjunction with a coaxial conical sieve,
- the hammer grinder, with a horizontal rotor fitted with blades and a semi-cylindrical sieve with the same axis as the rotor, and
- the oscillating grinder, whose horizontal- or vertical-axis rotor is located very close to the semi-cylindrical sieve and performs back-and-forth movements at low speed.

What all the above devices have in common is that they feature a casing supporting a first rotating grinding member and a second grinding member fixed relative to the casing, the first and second grinding members being spaced apart and co-operating to grind the powder, each of said first and second members generally being made of an electrically conductive material.

With these devices, grinding is the result of both impact and compression/shear forces experienced by the raw powder grains, one or other of these mechanical effects being more or less significant depending on the type of device considered.

To ensure sufficient impact forces, the rotational speed of the rotating part of powder grinders is generally very high, on the order of 20 to over 200 meters per second.

Also, to ensure sufficient compression/shear forces, the spacing between the grinding members is very limited, of the order of a few tenths of a millimeter to a few millimeters.

Given the high relative speeds and short distances between stationary and rotating parts, mechanical contact between these parts, caused, for example, by the presence of a metallic foreign body entering the grinder, must be absolutely avoided, as such contact would not only risk damaging the equipment, but would also pollute the ground product. Such mechanical contacts can also present production safety problems, since they can generate sparks and/or a local rise in temperature that can ignite the powder-gas mixture and cause an explosion.

To date, foreign body detection modules are sometimes installed upstream of the grinding equipment, but this solution considerably increases the cost and bulk of the installations. Vibration measurements can also be used in some cases to stop the grinder quickly in the presence of foreign bodies, but these systems are regularly disrupted by the normal vibrations caused by the grinding process itself.

SUMMARY OF INVENTION

One of the objects of the present invention is therefore to propose a powder grinder which solves the above-mentioned problem and, in particular, enables the detection of conductive foreign bodies, e.g. metallic, which may be present in the grinder, thus ensuring the stability and quality of the grinding process by stopping the equipment.

According to the invention, this object is attained by way of the subject matter of the independent claims. The more specific aspects of the present invention are described in the dependent claims as well as in the description.

More specifically, an object of the invention is attained by means of a mechanical powder grinder, in particular pin grinder or sieve grinder, in particular conical sieve grinder or hammer grinder or oscillating grinder, comprising a casing supporting a first rotating grinding member and a second grinding member fixed relative to the casing, the first and second grinding members being separated from each other by a gap and co-operating to grind the powder, each of said first and second members being made of an electrically conductive material, and the grinder being characterized in that it is provided with an electrical control circuit making at least one primary electrical connection between the first and second grinding members, said electrical circuit comprising at least one device for measuring an electrical parameter of said circuit, and the grinder further comprises a processing device configured to detect an additional connection between the two grinding members, in particular due to the presence of a foreign body between said members, from the measured value of said parameter.

In the grinder according to the invention, the gap between the two grinding members forms a grinding zone in which the powder is compressed and/or sheared and/or shocked.

In normal grinder operation, there is no direct mechanical contact between the first and second grinding members. Particularly in the gap forming the grinding zone, the two members do not touch but co-operate to grind the powder. The co-operation between them consists in a relative displacement that stirs and throws the powder, so as to subject it, between the two members, to the aforementioned compression/shearing and/or impact forces.

In the electrical control circuit according to the invention, the first and second grinding members form the two terminals of a switch, so to speak.

In normal operation, the switch is open: there is no direct mechanical contact between the first and second grinding members and, in the grinding zone, the gap between them is free or filled with non-conductive material. As a result, there is no additional electrical connection between the grinding members, over and above the primary electrical connection (s). The gap between the two members can be likened to an infinite resistance.

In the event of contact between the two grinding members via a conductive foreign body (indirect contact), or in the event of direct contact due, for example, to deformation of the grinder, the switch is closed: in this case, there is an additional electrical connection between the grinding members, due in particular to the presence of a conductive intermediate body between these members. The resistance of this additional electrical connection between the first and second grinding members depends on the nature of the contact made: if, for example, the intermediate body is highly conductive, then the resistance is zero or virtually zero.

In particular, the electrical control circuit associated with the measuring device makes it possible to evaluate the relative insulation—or equivalent resistance—between the first and second grinding members.

Advantageously, the processing device can also be configured to detect, from the measured parameter value, a connection anomaly on the electrical control circuit, and in particular an anomaly in the primary electrical connection. A connection anomaly may, for example, correspond to the absence of one of the grinding elements, or to poor contact in the primary electrical connection (cut wire, poor connection, etc.).

The electrical parameter measured by the measuring device can be a voltage, a resistance or a current intensity. It is representative of the equivalent resistance between the first and second grinding members. Said in another way, variations in this parameter can be deduced from variations in the equivalent resistance between the first and second grinding members.

In one example, the two grinding members are physically separated by at least one electrically insulating element, so that the primary electrical connection(s) constitute the only passages for an electrical current between this grinding member and the second, during normal operation of the grinder.

More specifically, at least one of the grinding members can thus be electrically insulated from the casing, i.e. physically separated from the latter and from the other grinding member by at least one electrically insulating element. In the present application, and for ease of understanding, such a member will be referred to as "electrically insulated", although it is not, in itself, totally insulated.

Advantageously, the fixed grinding member is electrically insulated.

In particular, in the aforementioned case of a sieve grinder, the sieve can be the member electrically insulated from the casing.

As an alternative or in addition, the first rotary grinding member can also be electrically insulated.

According to one example, the first and second grinding members are physically separated from each other by at least one intermediate part made of a non-conductive material, notably a synthetic material, in particular a polymer material, even more particularly an elastomer material.

In a particular embodiment, such an intermediate part can also have a sealing function, for example to prevent powder from bypassing the sieve or to avoid retention zones.

In one example, the first and second grinding members are physically separated from each other by at least one non-conductive covering.

If it is the static grinding member (fixed relative to the casing) that is electrically insulated, then such a non-conductive covering can in particular be applied directly to said fixed member and/or to a part of the casing supporting this member.

More specifically, an electrically insulated member as explained above can be physically separated from the casing and the other grinding member by a non-conductive intermediate part and/or a non-conductive covering.

In one example, a primary electrical connection is made via at least one resistive element. In other words, the electrical control circuit incorporates at least one resistive element between the first and second grinding members.

The resistive element generally has a fixed, known resistance.

For safety reasons, a grinding member that is electrically insulated from the casing must be grounded. Such a connection enables electrostatic discharge and avoids sparks and any resulting explosions. The member is therefore advantageously grounded via such a resistive element, which enables safe discharge of the insulated member.

In this case, the resistance value of the resistive element must be below a certain limit value, beyond which the discharge would no longer be sufficiently fast and effective. For example, the resistive element has a resistance R of between 1 ohm and 1 megaohm.

According to one example, a resistive element of the control circuit is formed by at least one intermediate part and/or at least one covering interposed between the first and second grinding members.

The electrical control circuit is governed by ohm's law ($U=R*I$) and can therefore be characterized in various ways using a corresponding measuring device.

According to one example, the measuring device is an ohmmeter.

Alternatively, a current measurement with an ammeter, a voltage measurement with a voltmeter or any other suitable measurement can be envisaged.

According to one example, the measuring device is connected in parallel with a resistive element of the primary electrical connection.

More specifically, the resistive element can be located on a first branch of the circuit forming a primary electrical connection between the two grinding members, and the measuring device can be located on a second branch of the circuit connected respectively to two points of said first branch located on either side of the resistive element. In this case, the measuring device and resistive element are connected to each grinding member via the same contact point. In this case, however, in the event of an anomaly in the electrical connection, the measured resistance is the same as during normal operation, even in the presence of a conductive foreign body between the two grinding elements, for example. In other words, in this configuration, the detection system is unable to identify undesirable electrical contact between the two grinding members, in the event of failure of the electrical assembly.

According to another more advantageous example, the resistive element is mounted on a first branch of the electrical circuit connected to a first contact point of a grinding member and the measuring device is mounted on a second branch of the electrical circuit connected in parallel with the first branch and connected to a second contact point of the same grinding member, spaced from the first contact point.

This additional contact makes it possible to detect any connection problems with the double-contact grinding member, or to detect whether the member in question is missing.

According to a particular example of the invention, the grinder is a sieve grinder, for example a conical sieve grinder. In this case, the sieve forms the second grinding member, fixed relative to the casing.

The sieve can have any shape of opening, especially round and/or square.

This sieve can also be a rasp with openings featuring a beak.

According to one example, the maximum width of the gap between the first and second grinding members is between 0.2 millimeter and 10 millimeters.

According to another aspect, the invention relates to a method for controlling a powder grinder as defined above, in particular a method for detecting electrically conductive foreign bodies in such a powder grinder and/or for detecting an additional connection between the grinding members of such a grinder, the method comprising at least the steps in which:

a parameter representative of the electrical control circuit is measured, the measured value of said parameter is used as a basis to detect an additional connection, by direct or indirect contact, between the two grinding members.

According to one example, the measured value of said parameter is used furthermore to detect the presence of a connection anomaly in the electrical control circuit.

BRIEF DESCRIPTION OF THE DRAWINGS

The features and advantages of the present invention will become apparent in greater detail in the description which follows, together with an illustrative and non-limiting example of an embodiment, with reference to the five drawings attached hereto, which show.

DETAILED DESCRIPTION

Figure 1:
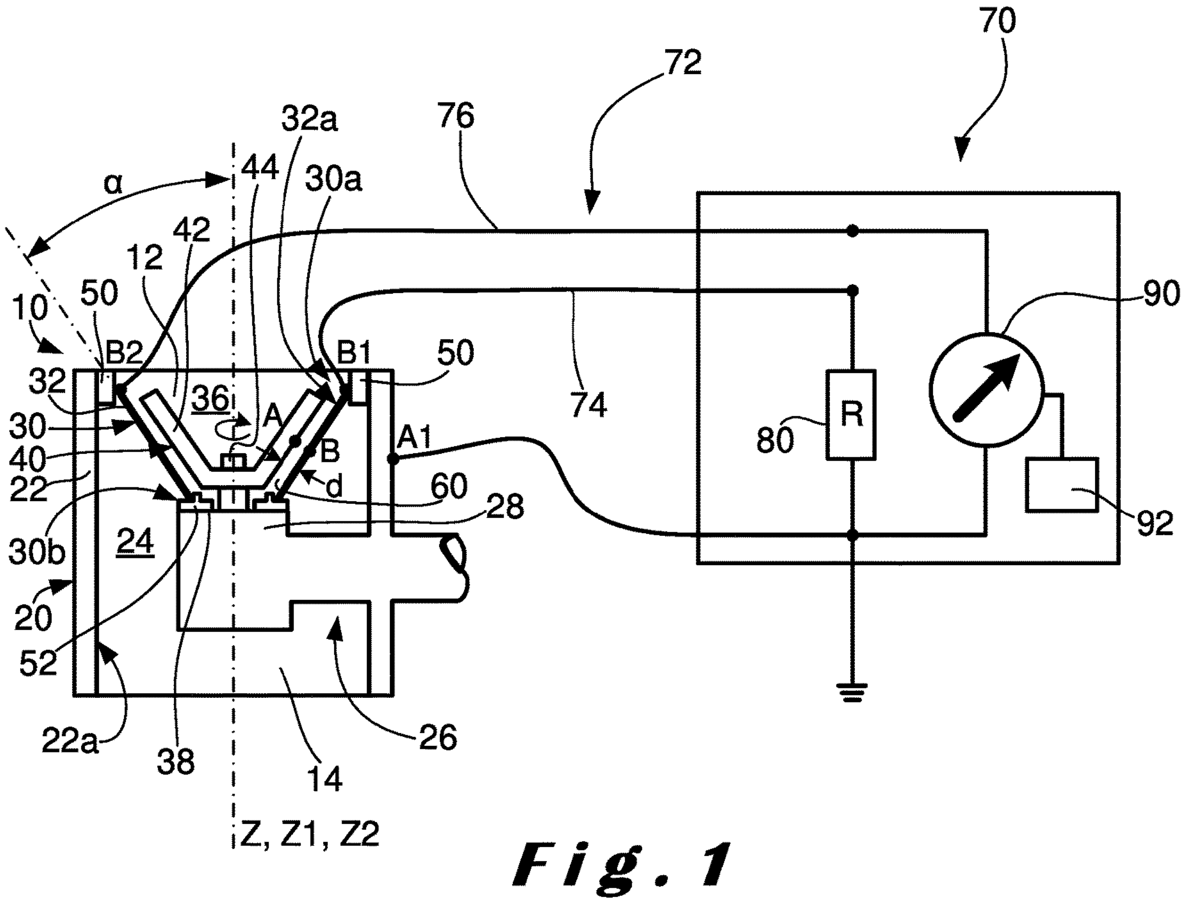
FIG. 1 schematically illustrates a powder grinder according to a first embodiment of the invention.

FIG. 1 illustrates a powder grinder 10 according to a first embodiment of the invention. This is a conical sieve grinder, but the invention is not limited to this type of grinder and can be implemented in an equivalent way on any other powder grinder, in particular with sieves or pins.

In the example shown in FIG. 1, the grinder 10 comprises a metal casing 20 comprising an external wall 22, for example substantially tubular, delimiting an enclosure 24 of axis Z, and an internal part 26 integral with the external wall 22 and projecting inside the enclosure 24, said internal part comprising at least one support portion 28 located along the axis Z, inside the enclosure 24 delimited by the casing 20, a sieve 30 and a rotor 40 forming two grinding members which co-operate with each other to grind raw powder introduced into the grinder 10 from above.

The raw powder processed by such a grinder 10 is typically made up of grains with an average diameter of between 500 microns and 20 millimeters, for example. Once ground, the powder is made up of grains with an average diameter of between 100 microns and 5 millimeters.

Examples of materials that can be ground in this way include active ingredients or excipients for the manufacture of medicines, food products such as lactose, or any other powder for pharmaceutical, chemical or food use.

The sieve 30, fixed relative to the casing 20, delimits an upstream part 12 and a downstream part 14 of the grinder within the enclosure 24. The upstream part 12 receives the raw powder to be ground and the downstream part 14 receives the ground powder after it has passed through the sieve 30.

In this example, the sieve 30 has a truncated cone shape with axis Z1. Its perforated wall 32 is inclined at an angle $\alpha$ of, for example, between 20 and 60° with respect to this axis Z1. The sieve 30 is arranged inside the casing 20 with its Z1 axis vertical, parallel to—and generally coincident with—the Z axis of the enclosure 24. Its widest end 30*a* faces upwards, and thus towards a device for feeding the powder to be ground (not shown), which may comprise a valve or a metering wheel, for example. At its lower end 30*b*, the sieve 30 is supported by the support portion 28 of the casing 20.

The wall 32 of the sieve 30 is provided with a plurality of openings (not visible on the figure), of any shape, in particular round or square, intended to allow the passage of powder grains of a defined maximum diameter. The inner face 32*a* of the sieve 30 may be smooth, or the openings may have a beak projecting towards the inside of the sieve, forming a rasp.

The rotor 40, movable relative to the casing 20 and therefore relative to the sieve 30, is accommodated in the interior space 36 delimited by the wall 32 of the sieve 30.

It is formed by a plurality of blades 42 integral with a hub 44 rotatably mounted about its axis Z2 and also supported by the support portion 28 of the casing 20. The means of moving the rotor (motor, transmission), well known to those skilled in the art, are integrated into this support portion 28 or mounted outside the grinder and are not shown in FIG. 1.

The rotor 40 is arranged coaxially with the sieve 30. Each blade 32 is arranged so that one of its edges is permanently flush with the inner wall 32*a* of the sieve 32 at a distance d during rotation.

The rotor 40 is therefore not in contact with the sieve 30, and a gap 60 of width d is maintained between the two grinding members 30, 40. In the example, the sieve 30 defines, at its lower end 30*b*, an opening 38 through which passes—without contact—the hub 44 of the rotor 40.

When the grinder 10 is in operation, raw powder grains are discharged by gravity into the upstream part 12 of the grinder, onto the rotor/screen assembly, via the feed device.

With the rapid rotation of rotor 40, the grains are thrown at high speed against the inner face 32*a* of the wall 32 of sieve 30. The grains are also subjected to compressive and shear forces between the blades 42 of the rotor 40 and the wall 32 of the sieve 30. As a result of the impact and compression/shearing forces, the grains are broken up and their average diameter is reduced, allowing them to pass through the openings in the sieve 30 to the downstream part 14 of the grinder 10, where they are collected.

In accordance with the invention, the grinder 10 is provided with a detection system 70 for detecting undesirable electrical contact between the two grinding members 30, 40, in particular due to the interposition between them of an electrically conductive foreign body, for example a metal body (e.g. a screw, bolt, etc.) present in the raw powder.

The detection system 70 comprises an electrical control circuit 72 configured to make at least one primary electrical connection between the first and second grinding members 30, 40 and comprising at least one measuring device 90 for measuring an electrical parameter of the circuit, in particular a multimeter, an ohmmeter, an ammeter or a voltmeter.

The detection system 70 furthermore comprises a processing device 92 configured to detect an additional connection between the two grinding members 30, 40 on the basis of the value thus measured by the measuring device 90.

The two grinding members 30, 40 are electrically separated from each other by electrically insulating elements, so that the primary electrical connection(s) constitute the only passages for an electrical current between the two members, during normal operation of the grinder.

In particular, at least one from among the rotor 40 and the screen 30 is electrically insulated from the casing 20. In the particular example shown, it is the sieve 30 that is insulated from the casing 20, by electrically non-conductive intermediate parts, notably made of synthetic material, in particular a polymer material, even more particularly an elastomer material.

In the particular example shown, at least one first intermediate piece 50 is interposed laterally between the outer wall 22 of the casing 20 and the upper end 30*a* of the sieve 30. This intermediate part 50 has an electrical insulation function, but it can also be used to secure the sieve 30 to the casing 20, and/or to provide a seal between the sieve 30 and the casing 20. The raw powder to be ground is thus prevented from passing directly into the downstream part 14 of the grinder 10 without having passed through the sieve 30. Advantageously, the first intermediate part 50 is designed to flank the upper end 30*a* of the sieve 30 around its entire periphery, thus forming a closed contour. This may be a part of annular shape, for example. The first intermediate part 50 can, for example, be fixed to the sieve 30 and to the casing 20 by gluing.

As a variant, the grinder 10 could comprise a plurality of first intermediate parts 50 at the periphery of the sieve 30, enabling the sieve 30 to be isolated from the outer wall 22 of the casing 20. In this case, other means may be used to ensure the necessary seal.

As shown in FIG. 1, the sieve 30 is also insulated from the support portion 28 of the casing 20, at its lower end 30*b*, by at least one second intermediate part 52 made of non-conductive material. In the example, the second intermediate part 52 is arranged on the upper side of the support portion 28, and the lower end 30*b* of the sieve 30 rests and is advantageously fixed, for example by gluing, on said second intermediate part 52.

As an alternative or in addition to the above-mentioned intermediate parts 50, 52, insulation can also be provided by a non-conductive covering. In the example, such a covering would be applied in particular to the sieve 30 and/or to the parts of the casing holding this part (here in particular the support portion 28 and/or the outer wall 22 of the casing 20).

The rotor 40 is itself mounted directly on the support portion 28, and is therefore in electrical contact with this portion 28 and the entire casing 20.

In the particular example shown in FIG. 1, the electrical control circuit 72 comprises a first branch 74 connected to a first contact point B1 of the sieve 30, on the one hand, and to a contact point A1 of the casing 20, on the other hand. The first branch 74 includes a resistive element 80 or grounding resistor, of resistance R, via which the sieve 30 is grounded.

The resistance R is preferably between 1 ohm and 1 megaohm to enable sufficiently rapid and effective electrical discharge if required.

Here, the measuring device 90 is connected in parallel with the resistive element 80, on a second branch 76 of the electrical circuit 72 connected to a second contact point B2 of the sieve 30, spaced apart from the first contact point B1, and to point A1 of the casing 20.

Due to the electrical contact between rotor 40 and casing 20, the point A1 of connection to casing 20 is also electrically connected to rotor 40.

Figure 2:
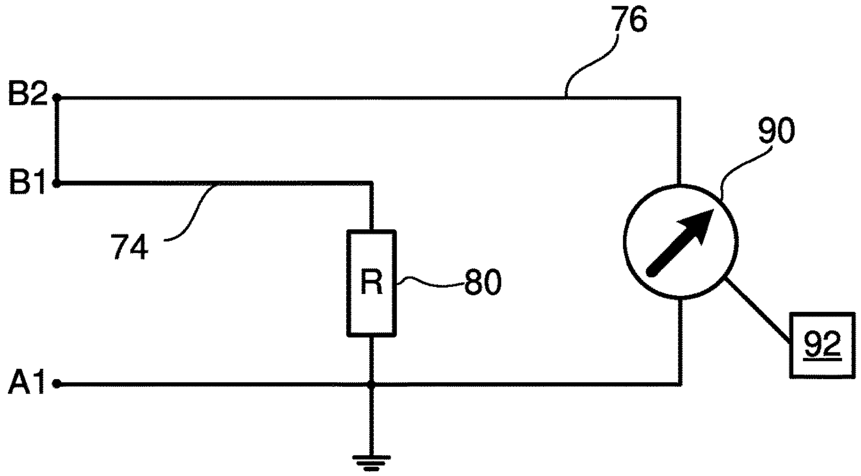
FIG. 2 is an electrical circuit equivalent to the assembly shown in FIG. 1, in normal grinder operation.

During normal operation of grinder 10, gap 60 of width d separates rotor 40 and sieve 30, so that an electric current cannot flow directly from one to the other through this gap. In the electrical control circuit 72, gap 60 is thus equivalent to an open switch or an infinite $R_{AB}$ resistance. FIG. 2 shows the electrical diagram equivalent to the assembly shown in FIG. 1, in normal operation.

The device 90 is, for example, an ohmmeter, configured to measure a resistance corresponding to the equivalent resistance between the points B1 and A1 obtained through the relationship (1)

$$R_{eq} = \frac{1}{\frac{1}{R1} + \frac{1}{R2}} \tag{1}$$

with:

R1 the resistance of the first branch 74 of the circuit, assimilated to the resistance R of the element 80, R2 the $R_{AB}$ resistance between the two grinding members at the gap 60, Req the equivalent resistance measured by the measuring device 90.

In normal operation of the grinder 10, the resistance R2 is infinite, and the equivalent resistance $R_{eq}$ is substantially equal to R1 and thus to the resistance R of the resistive element 80 (equivalent diagram of FIG. 2).

Figure 3:
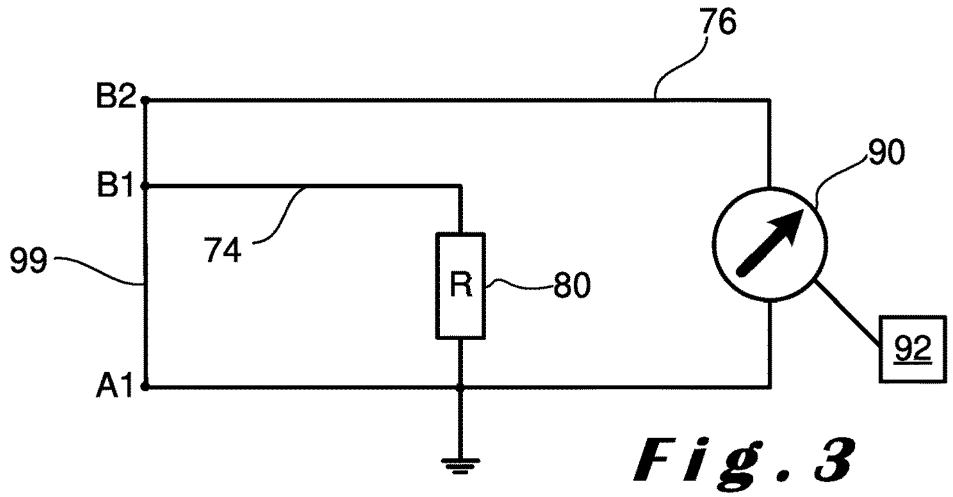
FIG. 3 is an electrical circuit equivalent to the assembly shown in FIG. 1, in the case of an additional contact between the two grinding members.

When a metallic foreign body is interposed between the blades 42 of the rotor 40 and the wall 32 of the sieve 30, this body forms an additional contact 99 between the two grinding members 30, 40. The body allows the current to pass and forms a resistive element of $R_{AB}$ resistance close to 0 (the element being metallic and thus conducting). In this case, the equivalent resistance $R_{eq}$ measured by the ohmmeter 90 is likewise close to 0 (equivalent diagram of FIG. 3). The situation is similar in the case of a direct contact between the blades 42 of the rotor 40 and the wall 32 of the sieve 30.

Figure 4:
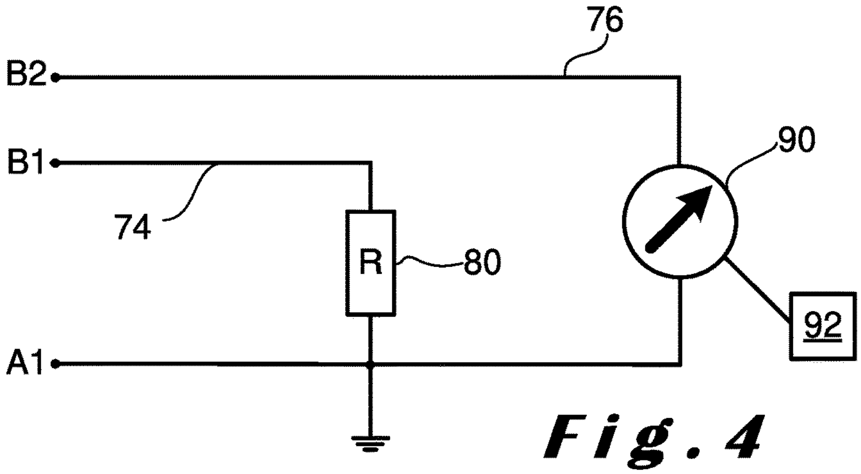
FIG. 4 is an electrical circuit equivalent to the assembly shown in FIG. 1, in the case of a connection fault in the control circuit.

In the case of a poor contact at point B1 and/or B2, or in the absence of sieve 30, the measuring device 90 detects an infinite resistance Req (equivalent diagram of FIG. 4).

The measurement results are transmitted to the processing device 92 configured to detect, on the basis of the measured equivalent resistance value, the presence of an additional electrical contact between the grinding members 30, 40. The processing device 92 communicates with the controller (not illustrated) which controls the grinder 10, so that an alarm and/or a total stop of the grinder 10 can be triggered in the case of an aberrant measurement.

Figure 5:
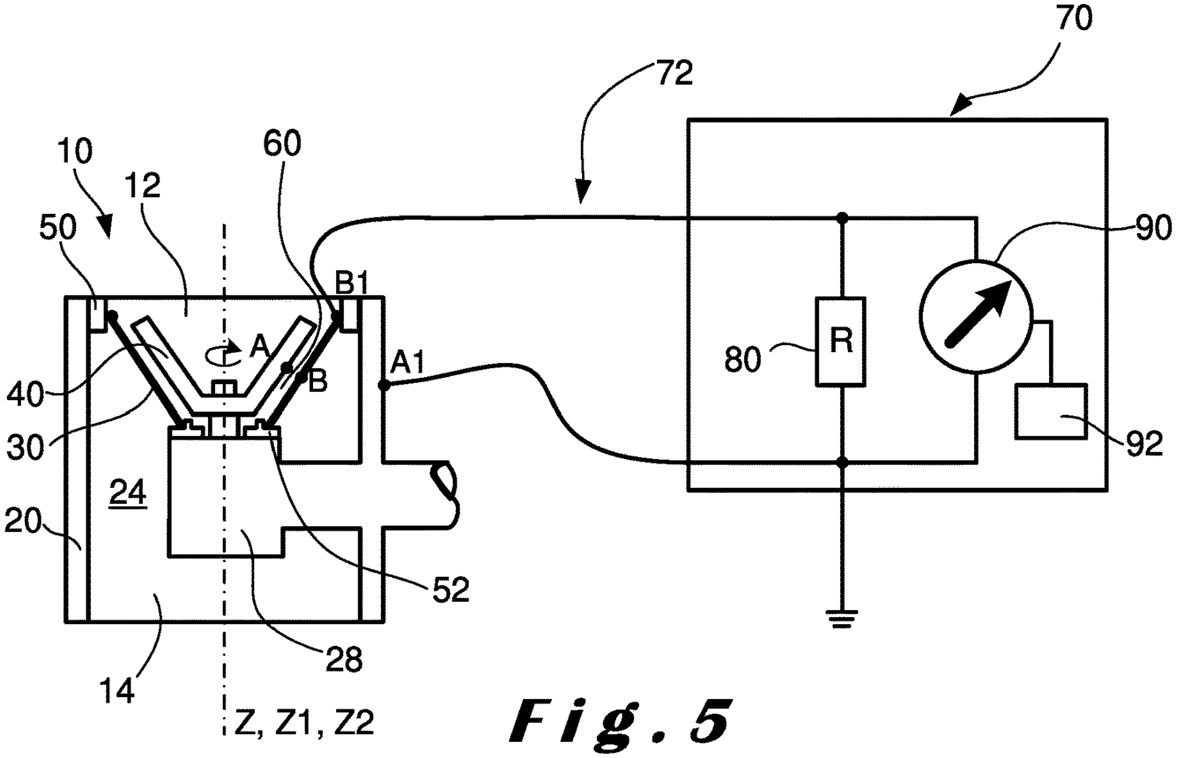
FIG. 5 schematically illustrates a powder grinder according to a second embodiment of the invention.

FIG. 5 illustrates a grinder according to a second embodiment of the invention. Contrary to that which has been described in the foregoing in connection with FIG. 1, the measuring device 90 is connected here directly to the terminals of the resistive element 80. The resistive element 80 and the measuring device 90 are thus connected to the same contact point B1 of the sieve 30.

In this case, in normal operation of the grinder 10, the measuring device 90 detects a resistance equal to the resistance R of the resistive element 80. In the presence of an electrical contact between the two grinding members 30, 40, the resistance measured is zero. A connection anomaly is not detected in this case.

The embodiments described above are not limiting for the present invention, and numerous variants may be envisaged, in particular:

The measuring device can be, for example, a multimeter, an ammeter or a voltmeter or any other suitable device.

The grinding members can be adapted to the type of powder grinder under consideration.

The electrically insulating element of the casing can be the movable grinding member, or the two grinding members can be electrically insulated from the casing.

The invention claimed is:

1. A mechanical powder grinder comprising a casing supporting a first rotating grinding member and a second grinding member fixed relative to the casing, the first and second grinding members being separated from each other by a gap and adapted to co-operating in said gap to grind powder, each of the first and second grinding members comprising an electrically conductive material, an electrical control circuit making at least one primary electrical connection between the first and second grinding members and comprising at least one device for measuring an electrical parameter of the electrical control circuit, and a processing device configured to detect an additional connection between the first and second grinding members based on a measured value of said parameter, wherein the at least one primary electrical connection is made via a resistive element, and wherein the resistive element is mounted on a first branch of the electrical control circuit connected to a first contact point of one of the first and second grinding members, and the measuring device is mounted on a second branch of the electrical control circuit connected in parallel with the first branch and connected to a second contact point of the one of the first and second grinding members, spaced apart from the first contact point.

2. The mechanical powder grinder according to claim 1, wherein at least one of the first and second grinding members is grounded via said resistive element.

3. The mechanical powder grinder according to claim 1, wherein the second fixed grinding member is grounded via said resistive element.

4. The mechanical powder grinder according to claim 1, wherein the measuring device is connected in parallel with said resistive element.

5. The mechanical powder grinder according to claim 1, wherein the measuring device is an ohmmeter.

6. The mechanical powder grinder according to claim 1, wherein the first and second grinding members are physically separated from each other by at least one intermediate part comprising a non-conductive material.

7. The mechanical powder grinder according to claim 6, said non-conductive material being a polymer material.

8. The mechanical powder grinder according to claim 1, wherein the first and second grinding members are physically separated from each other by a non-conductive covering.

9. The mechanical powder grinder according to claim 1, wherein said resistive element or a further resistive element of the electrical control circuit comprises an intermediate part and/or a covering interposed between the first and second grinding members.

10. The mechanical powder grinder according to claim 1, wherein the second fixed grinding member is a sieve.

11. The mechanical powder grinder according to claim 1, wherein a maximum width of the gap between the first and second grinding members is between 0.2 millimeter and 10 millimeters.

12. A method for detecting electrically conductive foreign bodies in, and/or detecting an additional connection between the first and second grinding members of, the mechanical powder grinder according to claim 1, the method comprising at least the steps of:

measuring said electrical parameter as representative of the electrical control circuit, detecting, based on a measured value of said parameter, said additional connection by direct or indirect contact between the first and second grinding members.

13. A control method according to claim 12, wherein, based on the measured value of said parameter, a presence of a connection anomaly in the electrical control circuit is detected.

14. The mechanical powder grinder according to claim 1, said additional connection between the first and second grinding members being due to the presence of a foreign body between the first and second grinding members.

* * * * *